US011294884B2

(12) United States Patent
Banipal et al.

(10) Patent No.: US 11,294,884 B2
(45) Date of Patent: *Apr. 5, 2022

(54) ANNOTATION ASSESSMENT AND ADJUDICATION

(71) Applicant: International Business Machines Corporation, Armonk, NY (US)

(72) Inventors: Indervir Singh Banipal, Austin, TX (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 264 days.

This patent is subject to a terminal disclaimer.

(21) Appl. No.: 16/537,299

(22) Filed: Aug. 9, 2019

(65) Prior Publication Data
US 2021/0042290 A1  Feb. 11, 2021

(51) Int. Cl.
*G06F 40/00* (2020.01)
*G06F 16/23* (2019.01)
*G06N 20/00* (2019.01)
*G06F 40/169* (2020.01)
*G06F 40/253* (2020.01)
*G06F 40/117* (2020.01)

(52) U.S. Cl.
CPC ........ *G06F 16/2365* (2019.01); *G06F 40/117* (2020.01); *G06F 40/169* (2020.01); *G06F 40/253* (2020.01); *G06N 20/00* (2019.01)

(58) Field of Classification Search
CPC .... G06F 40/253; G06F 40/169; G06F 40/117; G06N 20/00
See application file for complete search history.

(56) References Cited

U.S. PATENT DOCUMENTS 8,712,758 B2   4/2014  Crouch et al.
10,120,861 B2  11/2018 Scally et al.
10,558,713 B2 * 2/2020  Lavy ................ G06N 7/005
(Continued)

FOREIGN PATENT DOCUMENTS

JP    2017049684    3/2017

OTHER PUBLICATIONS

List of IBM Patents or Applications Treated as Related, Jun. 2021.
(Continued)

*Primary Examiner* — Scott T Baderman
*Assistant Examiner* — Barbara M Level
(74) *Attorney, Agent, or Firm* — Lieberman & Brandsdorfer, LLC

(57) ABSTRACT

Embodiments relate to an intelligent computer platform to construct ground truth data. A document is subjected to NLP and grammatical elements of the document are identified. The identified grammatical elements are annotated and one or more annotations are assigned to the elements, with each annotation having corresponding meta-data. The assigned annotations are assessed for accuracy and a score associated with the meta-data is adjusted. The annotations are selectively re-assigned with respect to the identified grammatical elements responsive to the adjusted score. Ground truth data is constructed and the selectively re-assigned annotations are assigned to corresponding and identified grammatical elements.

15 Claims, 12 Drawing Sheets

(56) References Cited

U.S. PATENT DOCUMENTS

| | | | |
|---|---|---|---|
| 10,977,518 B1* | 4/2021 | Sharma | G06K 9/6223 |
| 11,188,517 B2* | 11/2021 | Banipal | G06N 5/02 |
| 2012/0095943 A1 | 4/2012 | Yankov et al. | |
| 2013/0110498 A1* | 5/2013 | Bekkerman | G06F 40/289 |
| | | | 704/9 |
| 2016/0078022 A1* | 3/2016 | Lisuk | G06F 40/117 |
| | | | 706/12 |
| 2016/0147399 A1* | 5/2016 | Berajawala | H04L 67/10 |
| | | | 715/753 |
| 2016/0162458 A1 | 6/2016 | Munro et al. | |
| 2016/0259775 A1 | 9/2016 | Gelfenbeyn et al. | |
| 2018/0068221 A1* | 3/2018 | Brennan | G06N 20/00 |
| 2018/0143962 A1 | 5/2018 | Tremblay et al. | |
| 2018/0165554 A1* | 6/2018 | Zhang | G06K 9/6256 |
| 2019/0384807 A1* | 12/2019 | Dernoncourt | G06F 40/169 |
| 2020/0005168 A1 | 1/2020 | Bhargava et al. | |
| 2021/0019339 A1* | 1/2021 | Ghulati | G06Q 50/00 |

OTHER PUBLICATIONS

Office Action for U.S. Appl. No. 16/537,302, dated Jun. 10, 2021.

Parde, N., et al., "Finding Patterns in Noisy Crowds: Regression-based Annotation Aggregation for Crowdsourced Data", Proceedings of the 2017 Conference on Empirical Methods in Natural Language Processing, pp. 1907-1912, Sep. 7-11, 2017.

Guan, M. Y., et al., "Who Said What: Modeling Individual Labelers Improves Classification", arXiv:1703.08774v2, Jan. 4, 2018.

Raykar, V. C., et al., "Eliminating Spammers and Ranking Annotators for Crowdsourced Labeling Tasks", Journal of Machine Learning Research 13 (2012) 491-518.

Qwaider, M. R. H., et al., "Find Problems before They Find You with AnnotatorPro's Monitoring Functionalities", Proceedings of the Fourth Italian Conference on Computational Linguistics CLiC-it 2017, pp. 275-280, Dec. 11-12, 2017.

* cited by examiner

ANNOTATION ASSESSMENT AND ADJUDICATION

BACKGROUND

The present embodiments relate to an artificial intelligence platform and machine learning for annotation assessment and adjudication. More specifically, the embodiments relate to training a model and using the trained model to detect annotation patterns and dynamically construct ground truth data.

In the field of artificial intelligent computer systems, natural language systems (such as the IBM Watson® artificial intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning.

Machine learning, which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data minimum, visual recognition, and natural language processing to solve problems and optimize human processes.

Cognitive systems are inherently non-deterministic. Specifically, data output from cognitive systems are susceptible to information provided and used as input. For example, as new machine learning models are deployed there is no guarantee that the system will extract the same entities as done previously. New models may adversely affect prior model results. Similarly, an error introduced through a document may result in extracting incorrect data and providing the incorrect data as output. Accordingly, there is a need to create deterministic behavior in the cognitive system(s).

SUMMARY

The embodiments include a system, computer program product, and method for annotation assessment and adjudication for ground truth data construction.

In one aspect, a computer system is provided with a processing unit and memory for use with an artificial intelligence (AI) computer platform to construct ground truth data. The processing unit is operatively coupled to the memory and is in communication with the AI platform. As shown and described, the AI platform includes tools in the form of a natural language (NL) manager, an annotation manager, an assessment manager, and a ground truth manager. The NL manager identifies one or more grammatical elements of a document. The annotation manager assigns one or more annotations to the identified grammatical elements, with each annotation having corresponding meta-data. The assessment manager assesses the assigned annotation (s) for accuracy and dynamically adjusts a score associated with the meta-data. In one embodiment, the score adjustment is responsive to the accuracy assessment. The assessment manager selectively re-assigns the annotation (s) responsive to the dynamically adjusted score. The ground truth manager constructs ground truth data and applies the selectively re-assigned annotation (s) to one or more corresponding identified grammatical elements.

In another aspect, a computer program device is provided with a computer readable storage medium and embodied program code executable by a processor and configured to construct ground truth data. Program code subjects a document to natural language processing (NLP), and identifies grammatical elements present in the document. The identified grammatical elements are annotated and one or more annotations are assigned to the elements. Each annotation has corresponding meta-data. Program code assesses the assigned annotation(s) for accuracy and adjusts a score associated with the meta-data responsive to the accuracy assessment. The annotation(s) are selectively re-assigned with respect to the identified grammatical elements responsive to the adjusted score. Program code selectively re-assigns the one or more annotation s to one or more corresponding and identified grammatical elements, effectively constructing ground truth data.

In yet another aspect, a method is provided for constructing ground truth data. A document is subjected to NLP and grammatical elements of the document are identified. The identified grammatical elements are annotated and one or more annotations are assigned to the elements, with each annotation having corresponding meta-data. The assigned annotation(s) is assessed for accuracy and a score associated with the meta-data is adjusted responsive to the accuracy assessment. The annotation(s) is selectively re-assigned with respect to the identified grammatical elements responsive to the adjusted score. Ground truth data is constructed by selectively re-assigning the annotation (s) to one or more corresponding and identified grammatical elements.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Ground truth (GT) is a term used in machine learning that refers to information provided by direct observation, e.g. empirical evidence, as opposed to information provided by inference. Attaching one or more taxonomy tags to GT data provides structure and meaning to the data. Annotated GT, or an annotation, is attached to the document or in one embodiment elements of the document, and indicates the subject matter of elements present within the document. The annotation is created and attached by annotators of different skillsets reviewing documents. As a method of quality control, an overlap of review is utilized, wherein two or more annotators may review the same document and attach different annotations to the same element. In this occurrence, it is the function of an adjudicator to review the conflicting annotations and make a determination of which annotation is correct. However, adjudication causes inefficiencies due to the amount of time it takes. Employing a method of adjudication based on static rules may increase efficiency, incorrect annotating will still occur because an annotator's ability to provide correct annotations is not static.

Figure 1:
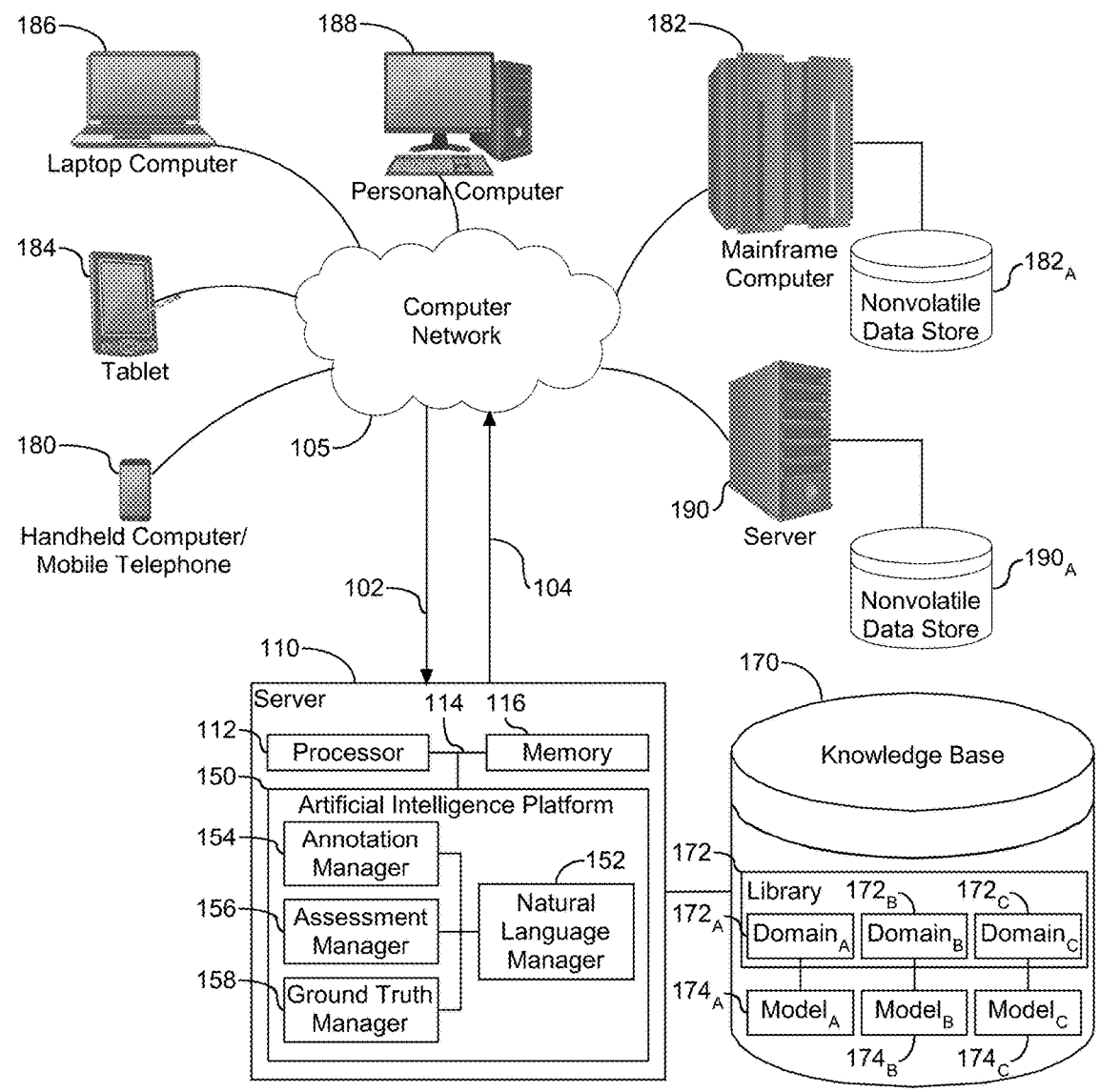
FIG. 1 depicts a system diagram illustrating an artificial intelligence platform computing system.

Referring to FIG. 1, a schematic diagram of an artificial intelligence platform computing system (100) is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) for cognitive computing, including NLP and ML, over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is shown herein configured with tools to enable supervised learning. The tools function to identify multi-lingual action tokens to support and enable multi-lingual action identification using machine learning techniques. The tools include, but are not limited to, a natural language (NL) manager (152), an annotation manager (154), an assessment manager (156), and a ground truth (GT) manager (158). The AI platform (150) may receive input from the network (105) and leverage a data source (170), also referred to herein as a corpus or knowledge base, to selectively access domain activity data. As shown the data source (170) is configured with a library (172), also referred to herein as a domain library. In one embodiment, the domain library may be distributed over the network (105). Accordingly, the AI platform (150) and the corresponding tools (152)-(158) are operatively coupled to the knowledge base (170) and the corresponding domain library (172).

The domain library (172) contains a plurality of domains. In one embodiment, a domain is a subject matter topic. Documents are placed into a respective domain based on the annotations that are attached to identify grammatical elements within the document. The annotations contain metadata indicating the subject matter present in the document and dictate in which domain the document should be stored. In one embodiment, a domain may be further sub-divided into sub-domains, and the domain library would be correspondingly sub-divided into sub-domain libraries. Similarly, it is understood that the collection of documents in the domain library may be dynamic, with library subject to addition and/or removal of documents. As shown herein, the domain library (172) is shown with a plurality of domains. The domains shown herein include, but are not limited to domain$_A$ (172$_A$), domain$_B$ (172$_B$), and domain$_N$ (172$_N$). Although only three domains are shown and represented herein, the quantity should not be considered limiting. Each domain shown also has an associated model, with each individual model representing the subject matter topic associated with the domain. The models shown herein include, but are not limited to, model$_A$ (174$_A$), model$_B$ (174$_B$), and model$_N$ (174$_C$). Although only three models are shown and represented herein, the quantity should not be considered limiting. Details of how the models are utilized are shown and described in detail below. Accordingly, the knowledge base (170) is shown with a domain library (172) to organize and store a plurality of domains (172$_A$)-(172$_N$) and corresponding models (174$_A$)-(174$_N$).

It is understood that supervised learning leverages data from the knowledge base. As shown herein, the knowledge base (170), also referred to as a data source, is configured with domains and logically grouped activity data in the form of models, structure(s), and module(s). The NL manager (152) functions to subject a received document to NLP to identify grammatical elements therein. The NL manager (152) may receive a document from the various computing devices (180), (182), (184), (186), (188), and (190) in communication with the network (105). Once the document is received, the NL manager (152) subjects the document to NLP for identification of one or more grammatical elements. Grammatical elements can be in various forms, including, but not limited to, nouns, pronouns, verbs, contractions, adjectives, antecedents, etc. These are just examples of grammatical elements that may be identified through NLP, and should not be considered limiting. Accordingly, the NL manager (152) subjects a document to NLP and identifies grammatical elements in the document.

The annotation manager (154) functions to annotate the identified grammatical elements and is operatively coupled to the NL manager (152). The annotation manager (154) leverages the identified grammatical elements and assigns an annotation to the identified grammatical elements. The annotation provides information about the document and the identified grammatical elements. In one embodiment, the annotation contains information about the domain in which the document should be placed. Characteristic data associated with an annotating entity and the annotation is identified and attached to the annotation as metadata. In one embodiment, the metadata can include, but is not limited to, an identifier of the annotating entity and a timestamp in which the annotation was assigned to the element. The annotation manager (154) leverages the domain library (172) to store the assigned annotations with the attached meta-data. Accordingly, the annotation manager (154) assigns an annotation to the identified grammatical elements in the document.

In another embodiment, the annotation manager (154) functions to train the model, also referred to herein as a neural model, to detect corresponding patterns. The annotation manager (154) leverages the domain library (172) to extract the meta-data associated with the annotation assigned to the identified grammatical elements. The annotation manager (154) dynamically identifies the characteristic data associated with the annotating entity. The annotation manager (154) leverages the domain library (172) to create a model from the identified characteristic data. The created model in the domain library (172) is further leveraged by the annotation manager (154) to detect patterns in the assigned annotations. Accordingly, the annotation manager (154) extracts the meta-data associated with the assigned annotations to train the model to detect corresponding patterns in the annotations.

The assessment manager (156), which is operatively coupled to the annotation manager (154), functions to assess the assigned annotations. The assessment manager (156) leverages the domain library (172) to assess the assigned annotation for accuracy. The metadata associated with each annotation is assessed by the assessment manager (156) for accuracy. A weight characteristic representative of the accuracy of the annotation within the metadata is identified by the assessment manager (156). In one embodiment the weight characteristic is a trust score that is indicative of the annotating ability of the annotating entity. The identified weight characteristic is adjusted by the assessment manager (156) to reflect the accuracy assessment of the annotation. The assessment manager re-assigns the annotations with respect to the adjusted weight score. In one embodiment, the annotation with the highest weight characteristic will have the highest adjusted score, and will be re-assigned as the correct annotation for the corresponding grammatical element in the corresponding document. Accordingly, the assessment manager (156) assesses an assigned annotation for accuracy and re-assigns the annotations based on the adjusted weight characteristic score reflecting the assessment.

The assessment manager (156) further functions to generate a policy within a domain. The assessment manager (156) operatively coupled to the annotation manager (154), leverages the domain library (172) to evaluate the meta-data associated with the annotations within the domain. The assessment manager (156) generates a policy within the domain based on the evaluated and measured meta-data and the domain activity impact. The assessment manager (156) leverages the domain library (172) and orchestrates one or more compliance activities based on the policy within the domain. In one embodiment, the policy may identify selection of annotations from a specific annotator in a specific domain. Accordingly, the assessment manager (156) generates a policy based on the evaluated meta-data in the domain and orchestrates compliance activities based on the policy within the domain.

The ground truth (GT) manager (158), which is shown operatively coupled to the assessment manager (156), functions to construct ground truth data. The GT manager (158) applies the selectively re-assigned annotations with respect to the identified grammatical elements. Responsive to the adjusted score and in compliance with the generated policy and orchestration by the assessment manager (156), the GT manager (158) creates ground truth data. The annotations effectively create ground truth data for the grammatical elements present and identified in the document. By re-assigning annotations based on the corresponding score, the system and process effectively modify, and in one embodiment correct, any errors or conflicts associated with the ground truth data. Accordingly, the ground truth manager (158) creates ground truth data based on the selectively re-assigned annotations and identified grammatical elements.

As shown, the network (105) may include local network connections and remote connections in various embodiments, such that the AI platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the artificial intelligence platform (150) also including input interfaces to receive requests and respond accordingly.

The knowledge base (170) is configured with library (172) for use by the AI platform (150). In one embodiment, the knowledge base (170) may be configured with other or additional sources of input, and as such, the sources of input shown and described herein should not be considered limiting. Similarly, in one embodiment, the knowledge base (170) includes structured, semi-structured, and/or unstructured content related to activities and tasks. The various computing devices (180)-(190) in communication with the network (105) may include access points for the logically grouped domains and models.

The network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in network accessible sources and/or structured data sources. In this manner, some processes populate the AI platform (150), with the AI platform (150) also including one or more input interfaces or portals to receive requests and respond accordingly.

The AI platform (150), via a network connection or an internet connection to the network (105), is configured to detect and manage network activity and task data as related to travel and travel scheduling. The AI platform (150) may effectively orchestrate or optimize an orchestrated sequence of actions directed at related activity data by leveraging the knowledge base (170), which in one embodiment may be operatively coupled to the server (110) across the network (105).

The AI platform (150) and the associated tools (152)-(158) leverage the knowledge base (170) to support training a model to construct ground truth data. The annotation manager (154) leverages the NL manager (152) to train the model with a received communication to assign annotations to the identified grammatical components. The assessment manager (156) leverages the annotation manager (154) to assess an annotation for accuracy, re-assign the annotation based on the assessment, and create a policy and orchestration within a domain. The GT manager (158) leverages the assessment manager (156) to create ground truth data based on the re-assignment and generated policy and orchestration. In one embodiment, the orchestration pertains to one or more compliance activities that direct the assignment or re-assignment of the annotation(s) based on the policy generated from the accuracy calculation and assessment. Accordingly, the tools (152)-(158) train a model and uses the trained model to detect annotation patterns and apply a weight score to construct ground truth data.

Communications, e.g. electronic mail and messages, received across the network (105) may be processed by a server (110), for example IBM Watson® server, and the corresponding AI platform (150). As shown herein, the AI platform (150) together with the embedded tools (152)-(158) trains a model and uses the trained model to detect accuracy patterns of annotators and apply a weight score to construct ground truth data. The function of the tools and corresponding analysis is to assess the annotations attached to the identified grammatical elements for accuracy. Accordingly, the AI platform (150) trains a model to facilitate and enable construction of ground truth data.

In some illustrative embodiments, the server (110) may be the IBM Watson® system available from International Business Machines Corporation of Armonk, N.Y., which is augmented with the mechanisms of the illustrative embodiments described hereafter. The tools (152)-(158), hereinafter referred to collectively as AI tools, are shown as being embodied in or integrated within the AI platform (150) of the server (110). The AI tools may be implemented in a separate computing system (e.g., 190), or in one embodiment they can be implemented in one or more systems connected across network (105) to the server (110). Wherever embodied, the AI tools function to detect annotation patterns and dynamically construct ground truth data.

Types of devices and corresponding systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device or other devices that include a processor and memory.

Figure 2:
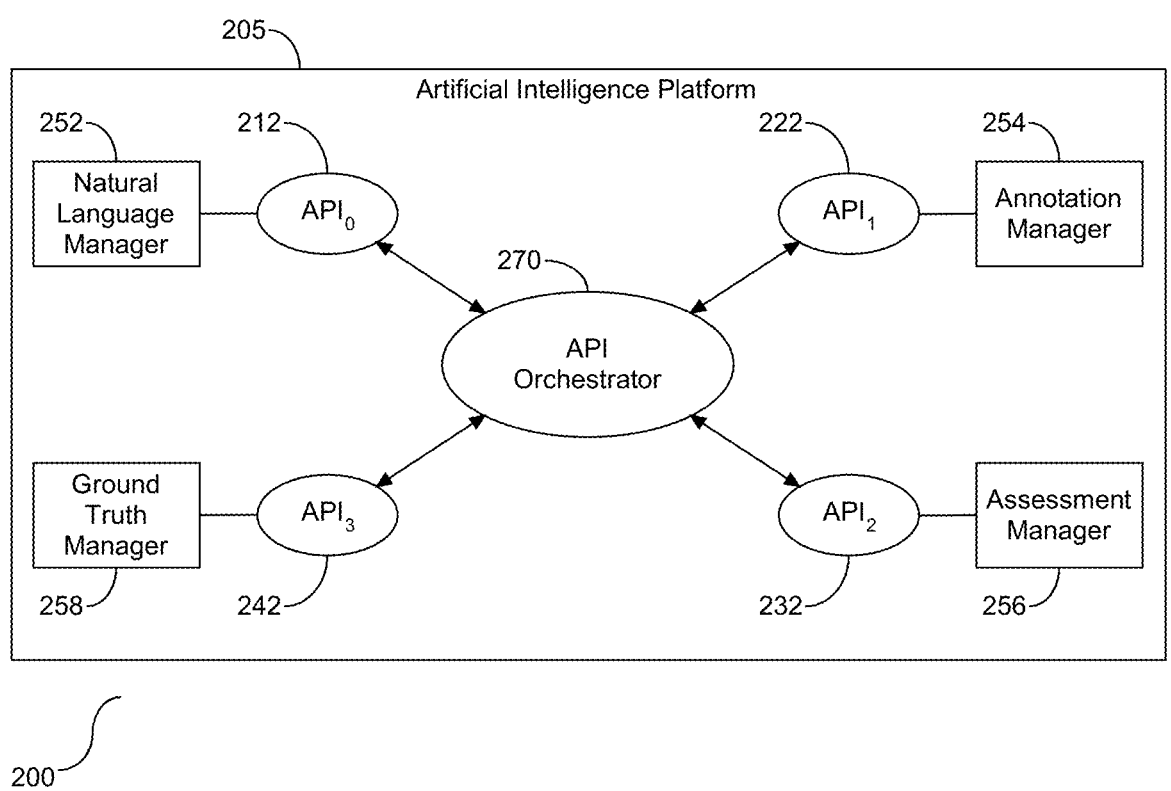
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(158), shown herein as tools (252)-(258), and their associated functionality. Referring to FIG. 2, a block diagram (200) is provided illustrating the tools (252)-(258) and their associated APIs. As shown, a plurality of tools is embedded within the AI platform (205), with the tools including the NLP manager (152) shown herein as (252) associated with $API_0$ (212), the annotation manager (154) shown herein as (254) associated with $API_1$ (222), the assessment manager (156) shown herein as (256) associated with $API_2$ (232), and the ground truth manager (158) shown herein as (258) associated with $API_3$ (242).

Each of the APIs may be implemented in one or more languages and interface specifications. $API_0$ (212) provides functional support to identify one or more grammatical elements in a document; $API_1$ (222) provides functional support to assign one or more annotations to the identified grammatical elements; $API_2$ (232) provides functional support to assess and re-assign one or more annotations, and $API_3$ (242) provides functional support to apply the re-assigned annotation(s) to one or more corresponding and identified grammatical elements. As shown, each of the APIs (212), (222), (232), and (242) are operatively coupled to an API orchestrator (270), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
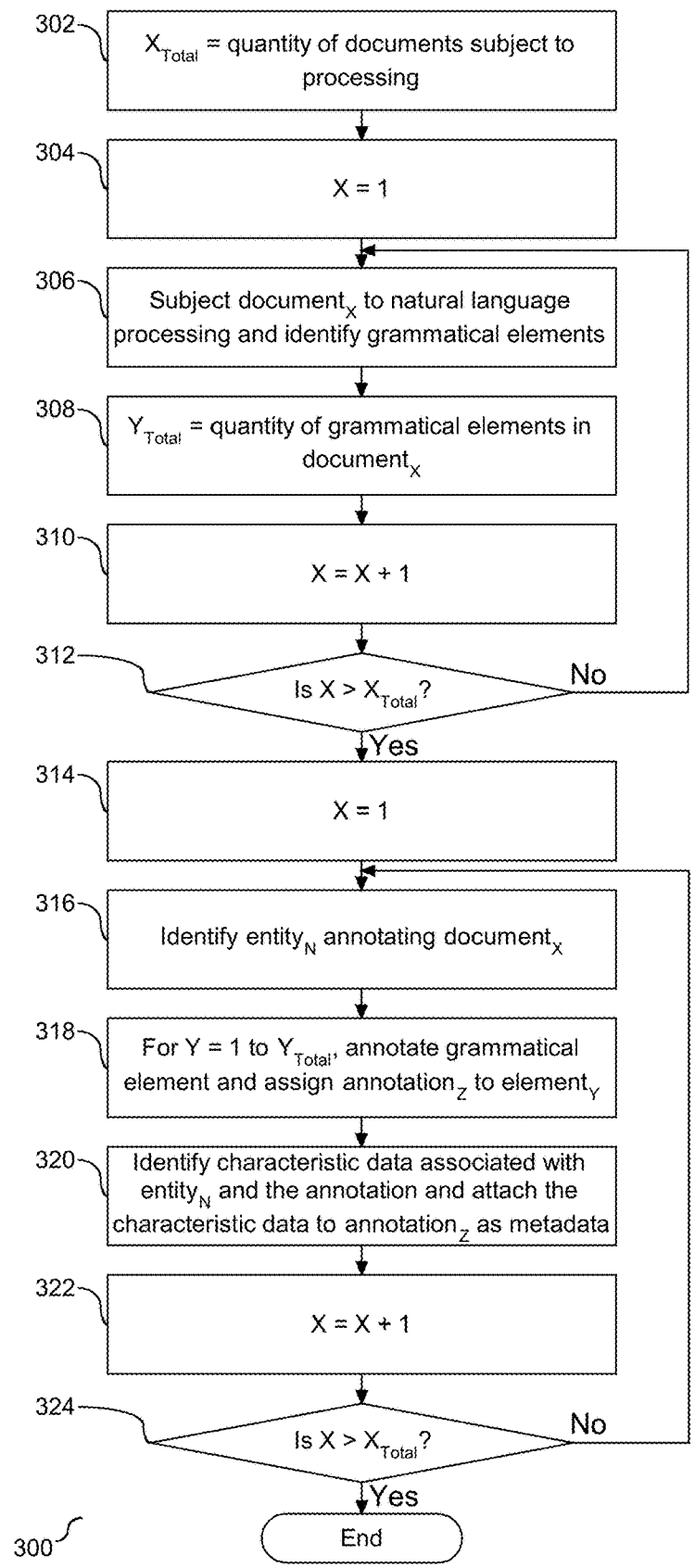
FIG. 3 depicts a flow chart illustrating a process for document processing.

Referring to FIG. 3, a flow chart (300) is provided to illustrate a process for document processing, and more specifically identifying and annotating grammatical elements therein. As shown, variable $X_{Total}$ represents a set or compilation of documents (302), and a corresponding document counting variable is initialized (304). Each of the documents, e.g. document$_X$, is subjected to NLP for identification of one or more grammatical elements in the document (306). Grammatical elements can be in various forms, including, but not limited to, nouns, pronouns, verbs, contractions, adjectives, antecedents, etc. These are just examples of grammatical elements that may be identified through NLP, and should not be considered limiting. The variable $Y_{Total}$ is assigned to represent a quantity of grammatical elements identified within each document, e.g. document$_X$, (308). Accordingly, as each document is subject to NLP, the grammatical elements within the documents are identified and represented.

Following step (308), the document counting variable, X, is incremented (310). It is then determined if each of the documents have been subject to NLP for identification and representation of grammatical elements (312). A negative response to the determination at step (312) is an indication that there is at least one document that has not be processed, as shown herein by a return to step (306). However, a positive response to the determination at step (312) concludes the process of subjecting the documents to NLP. Accordingly, one or more documents are subjected to NLP to identify and represent grammatical elements within the document(s).

After the grammatical elements have been identified, the document counting variable is re-initialized (314), and the annotating entity$_N$ of the document is identified (316). In one embodiment, the entity is the annotator of the document. In one embodiment, the document may be subject to annotating by more than one entity, with each entity creating a different selection or arrangement of document annotations. In one embodiment, the entity responsible for application of the annotation(s) is referred to as a subject matter expert (SME). The previously identified grammatical elements, e.g. element$_Y$, for the document, e.g. document$_X$, are subject to annotation, which includes assignment of an annotation, e.g. annotation$_Z$, to element$_Y$ in document$_X$ (318). The annotation provides information about the document and the identified grammatical elements. In one embodiment, the annotation contains information about the domain in which the document should be placed. Characteristic data associated with the annotating entity, e.g. entity$_N$, and the annotation is identified and attached to annotation$_Z$ as metadata (320). In one embodiment, the metadata can include, but is not limited to, an identifier of the annotating entity and a timestamp in which the annotation was assigned to the element, e.g. element$_Y$. Following step (320), the document counting variable, X, is incremented (322). It is then determined if entity characteristic data for each of the documents has been identified and attached or embedded as metadata (324). A negative response to the determination at step (324) returns the process to step (316), and a positive response to the determination at step (324) concludes the process of annotating the documents and the grammatical elements therein. Accordingly, identified grammatical elements are subject to processing in which the document is annotated and corresponding annotation characteristic data is attached or embedded as metadata.

Figure 4:
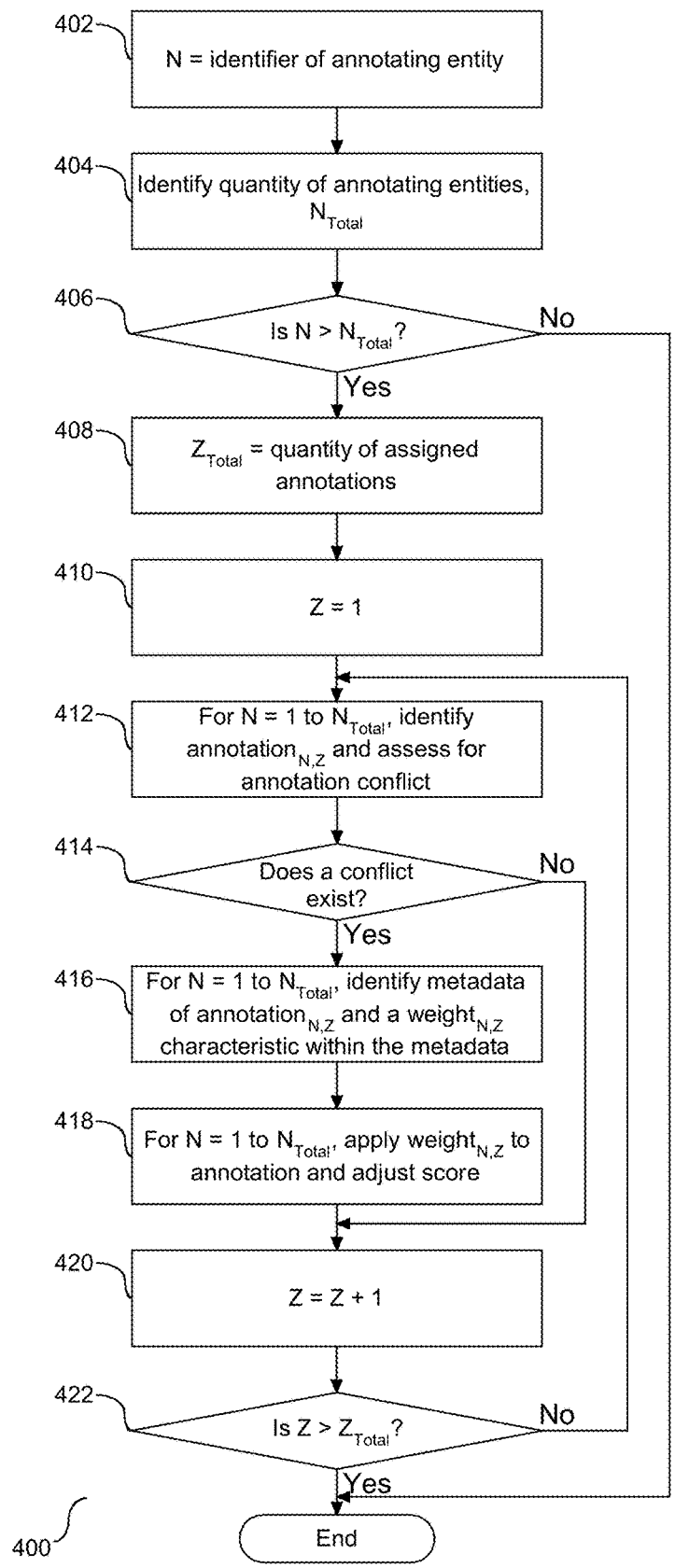
FIG. 4 depicts a flow chart illustrating a process for resolving a conflict between two or more annotations.

Referring to FIG. 4, a flow chart (400) is provided to illustrate a process for resolving a conflict between two or more annotations. It is understood in the art that a processed document may have been subject to annotating or annotation assignment by more than one entity, and that a conflict associated with the annotation assignment may exist or have been created by two or more annotating entities. In one embodiment, different annotating entities may have different innate values, which in one embodiment may correspond to a document domain or sub-domain. In one embodiment, a domain is a document subject matter. Similarly, in one embodiment the domain may be comprised of two or more sub-domains, which is a more specific and defined document subject matter topic falling within the more general subject matter topic of the domain. For example, the domain may be government affairs, and the sub-domains may be regulatory and statutory. Utilizing a weight characteristic associated with the annotation facilitates or may facilitate resolving annotating conflicts, as shown and described herein. The variable N is assigned to represent an identifier of the annotated entity (402), and the quantity of annotating entities, $N_{Total}$, is identified (404). It is then determined if more than one annotating entity has been identified (406). If there is only a single entity, then there cannot be any inter-entity conflict. A negative determination to step (406) ends the conflict evaluation process, and a positive response to step (406) concludes the process of identifying the annotating entities. Accordingly, the annotating entities are identified in order to resolve inter-entity conflicting annotations assigned to the same grammatical elements of a document.

After the annotating entities have been identified the variable $Z_{Total}$ is assigned to the quantity of annotations (408) and the annotation counting variable, Z, is initialized (410). For each identified annotating entity, N, the assigned annotations are identified and assessed for annotation conflicts (412). It is then determined if a conflict between any of the assessed annotations has been identified (414). In one embodiment, a conflict in annotations could be two separate and distinct annotations for the same element, and each annotation indicating a different domain for the document assigned to the same identified grammatical element. A negative response at step (414) is an indication that there is no identified inter-annotation conflict. As shown, the negative response at step (414) is followed by an increment of the annotation counting variable, Z, (420), and a determination to identify if all of the annotations have been assessed for conflict (422). A negative response to the determination at step (422) is followed by a return to step (412), and a positive response to the determination at step (422) concludes the process assessing annotations for conflicts. Accordingly, the initial annotation assessment is directed at identification of conflicting annotations within one or more documents.

An annotation conflict in one or more document annotations, or in one embodiment a potential annotation conflict, is demonstrated herein by a positive response to the determination at step (414). As shown herein, annotation metadata associated with each annotating entity is identified, and a weight characteristic embedded within or otherwise associated with the metadata is also identified (416). In one embodiment the weight characteristic is a trust score that is indicative of the annotating ability of the annotating entity. For example, in one embodiment the weight score correlates to value added by expertise of the annotating entity within a domain or sub-domain. It is understood in the art that the weight characteristics shown and described herein are merely examples and should not be considered limiting, as the weight characteristics can be indicative of a variety of traits. The identified weight is applied to the annotation for each annotating entity and a corresponding annotation score is subject to an adjustment (418). In one embodiment, the annotation with the highest weight will have the highest adjusted score, and will be selected as the correct annotation for the corresponding grammatical element in the corresponding document. Accordingly, conflicting annotations are resolved by identifying and applying one or more characteristics associated with the annotating entity.

Following step (418), the annotation counting variable, Z, is incremented (420). It is then determined if all of the annotations have been assessed for conflict (422). A negative response to the determination at step (422) is followed by a return to step (412), and a positive response to the determination at step (422) concludes the annotation assessment process, and more specifically conflict resolution between or among conflicting annotations. Accordingly, when conflicting annotations are detected, the weight of the annotating entity is identified and applied to the corresponding annotation score.

Figure 5:
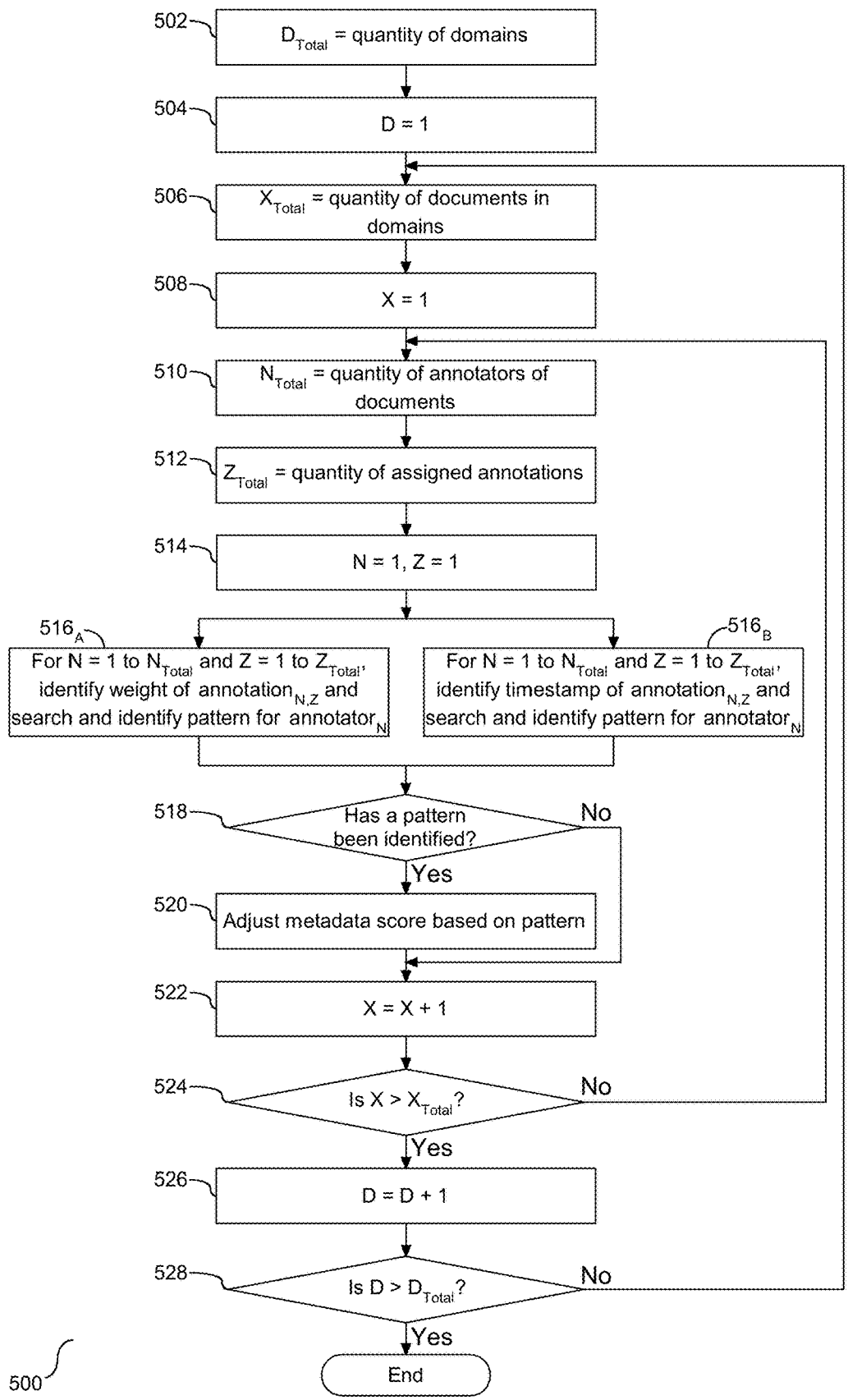
FIG. 5 depicts a flow chart illustrating a process for detecting an annotation pattern and adjusting a corresponding metadata score based on the pattern.

Conflicts between annotations may have an apparent or underlying pattern that serves as an explanation for the pattern. Identifying the conflict between annotations is one aspect, and identifying a pattern of conflicts is another aspect. Referring to FIG. 5, a flow chart (500) is provided to illustrate a process for detecting an annotation pattern and adjusting a corresponding metadata score based on the pattern. The variable $D_{Total}$ is assigned to represent the quantity of domains (502), and a corresponding domain counting variable, D, is initialized (504). The variable $X_{Total}$ is assigned to represent the quantity of documents in the domain, e.g. domain, (506). A corresponding document counting variable, X, is initialized (508). The variable $N_{Total}$ is assigned to represent the quantity of annotators of the subject documents (510) and the variable $Z_{Total}$ is assigned to represent the quantity of assigned annotations (512). For example, in one embodiment, individual documents may be subject to annotating or an annotating process by more than one entity, e.g. annotator. Accordingly, the total quantity of annotators is determined for each document within a domain.

Both a corresponding annotating entity, e.g. annotator, counting variable, N, and an annotation counting variable, Z, are initialized (514). Patterns may be present in different dimensions, each dimension based on characteristic data. For descriptive purposes, two dimensions are shown and described herein corresponding to the annotator and an annotation timestamp, although the quantity of dimensions should not be considered limiting. With respect to pattern identification associated with the annotating entity, for each annotator$_N$, and each annotation$_{N,Z}$ the weights of the annotations are identified and assessed to detect or identify any patterns present for annotator$_N$ (516$_A$). Similarly, with respect to pattern identification associated with timestamp(s), for each annotator$_N$, and each annotation$_{N,Z}$ the time that the annotation is attached, e.g. timestamp, is identified and assessed to detect the presence of any patterns present for annotator$_N$ (516$_B$). The patterns identification steps (516$_A$) and (516$_B$) may be performed simultaneously or sequentially, in any order, or in near-parallel, to identify patterns in the annotation s. Patterns may be apparent in different forms. For example, patterns may be based on time of day in which the annotations are assigned to the data. In one embodiment a pattern is detected for the annotations in the later part of the day having a lower weight value, indicating a pattern of fatigue that is demonstrated by a decrease in accuracy during one or more intervals. Accordingly, by assessing the weight values and times associated with the annotations of an annotating entity, trends within a domain can be identified.

Patterns may be identified on a variety of granularity. In the example shown herein, document annotations are assessed based on the annotating entity for pattern identification, although this granular characteristic should not be considered limiting. Following either step (516$_A$) or step (516$_B$), it is determined if a pattern associated with the annotations has been detected or otherwise determined (518). If the response to step (518) is positive, then the metadata score of the annotation is selectively adjusted or re-assigned based on the pattern (520). For example, in one embodiment, if it is detected that an annotating entity has a pattern of being less accurate during a specific time interval, then the metadata score of each annotation attached during that time interval by the annotating entity will be adjusted to reflect this trend. Following the adjustment at step (520) or a negative response to the determination at step (518), the document counting variable, X, is incremented (522). It is then determined if all of the documents in the domain have been processed with respect to pattern identification and evaluation (524). A negative response to the determination at step (524) is followed by a return to step (510), and a positive response is followed by an increment of the domain counting variable, D, (526). It is then determined is all of the domains have been processed for pattern identification (528). A negative response to the determination at step (528) is followed by a return to step (506), and a positive response concludes the process of identifying patterns within a domain. Accordingly, as patterns associated with the annotations and annotating entities are detected, the metadata scores of corresponding annotations are subject to an adjustment.

Figure 6:
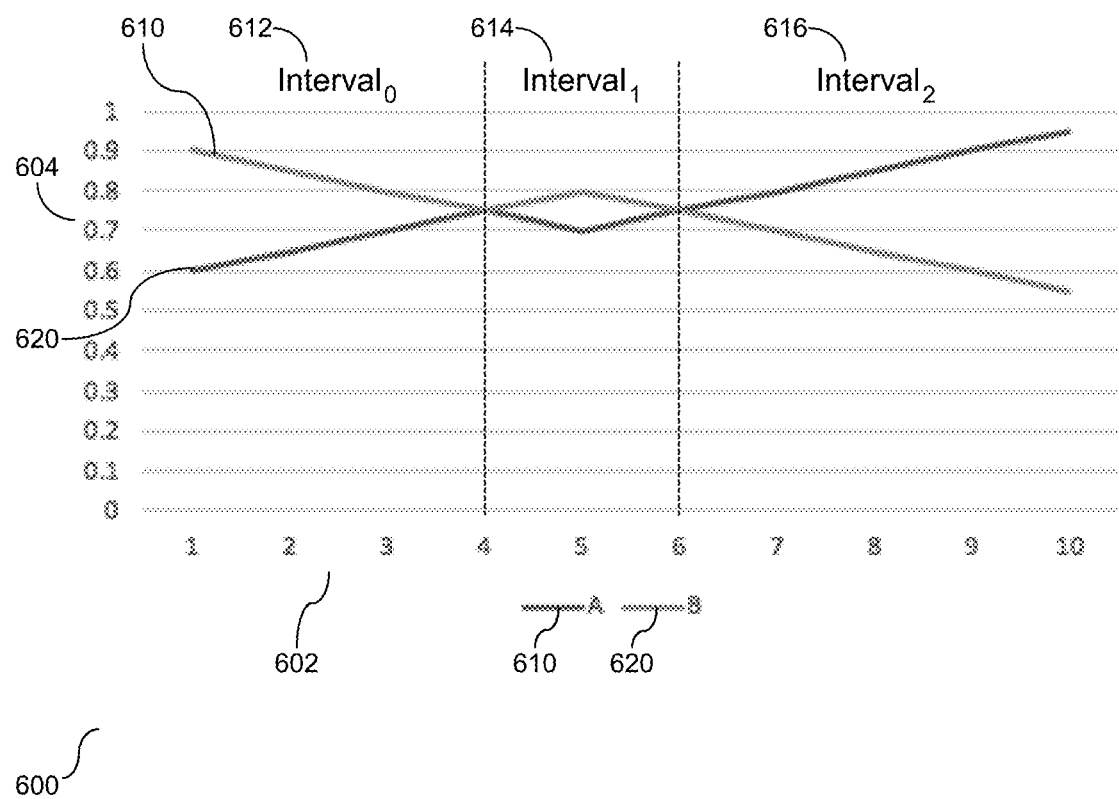
FIG. 6 depicts a graph illustrating multiple annotation patterns.

Referring to FIG. 6, a graph (600) is provided to illustrate multiple annotation patterns. The horizontal axis represents units of time (602). In one embodiment, the time units being measured are hours, although this unit should not be considered limiting. For example, in another embodiment, the time units being measured may be weeks, months, years, etc. The vertical axis represents measurements of accuracy of the annotation metadata (604). In one embodiment the accuracy is a trust score assigned to each annotation. Two functions are illustrated, including function$_A$ (610) corresponding to a first annotating entity, e.g. annotator$_A$, and function$_B$ (620) corresponding to a second annotating entity, e.g. annotator$_B$. The functions (610) and (620) represent a visual comparison of accuracy between annotator$_A$ and annotator$_B$ during an extended period of time. Three apparent intervals are shown, and represented herein as interval$_0$ (612), interval$_1$ (614), and interval$_2$ (616). As shown, the work product of annotator$_A$ has greater accuracy than annotator$_B$ for the units of time measured in interval$_0$ (612), the work product of annotator$_B$ has a greater accuracy than annotator$_A$ for the units of time measured in interval$_1$ (614), and the work product of annotator$_A$ has a greater accuracy than annotator$_B$ for the units of time measured in interval$_2$ (616). The accuracy patterns shown herein may be applied to the annotator weight(s) as shown and described in FIG. 5. Accordingly, patterns of the accuracy of annotators are shown herein changing over time.

Figure 7:
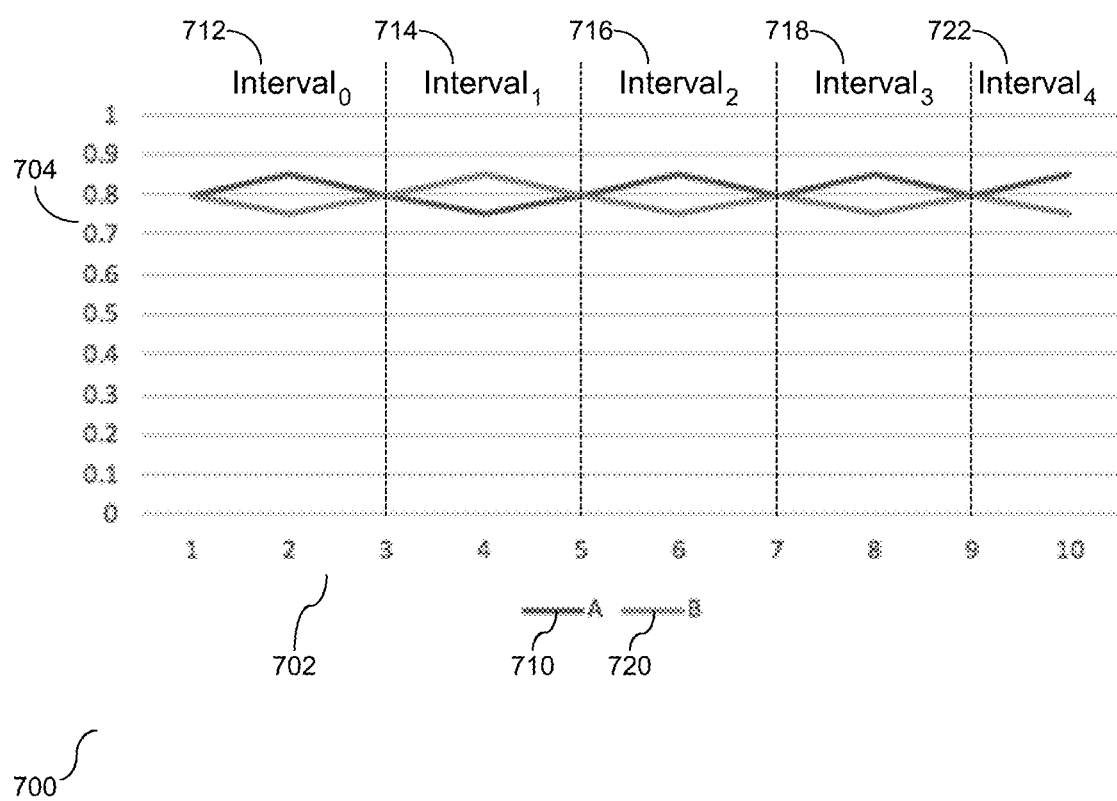
FIG. 7 depicts a graph illustrating converging annotation patterns.

The pattern example shown in FIG. 6 is one example of the patterns of two annotators detected over time. Referring to FIG. 7, a graph (700) is provided to illustrate converging annotation patterns. Similar to FIG. 6, the horizontal axis represents units of time (702) and the vertical axis represents measurements of accuracy of the annotation metadata (704). Two functions are illustrated, including function$_A$ (710) corresponding to a first annotating entity, e.g. annotator$_A$, and function$_B$ (720) corresponding to a second annotating entity, e.g. annotator$_B$. Five apparent intervals are shown, and represented herein as interval$_0$ (712), interval$_1$ (714), interval$_2$ (716), interval$_3$ (718), and interval$_4$ (722). As shown, the work product of annotator$_A$ has greater accuracy than annotator$_B$ for the units of time measured in interval$_0$ (712), interval$_2$ (716), and interval$_4$ (722). The work product of annotator$_B$ has a greater accuracy than annotator$_A$ for the units of time measured in interval$_1$ (714) and interval$_3$ (718). The accuracy patterns shown herein depict annotator$_A$ providing annotations with almost the same accuracy as annotator$_B$ where the patterns intersect at (732), (734), (736), and (738). When this type of pattern occurs between two or more annotators the system will converge the weight scores of annotator$_A$ and annotator$_B$ and apply the converged score to the annotation weight(s) as shown and described in FIG. 5. Accordingly, when the patterns of the accuracy of annotators are converging over time, the system will apply the converged weighted scores of the annotators to the annotation of the document.

Figure 8:
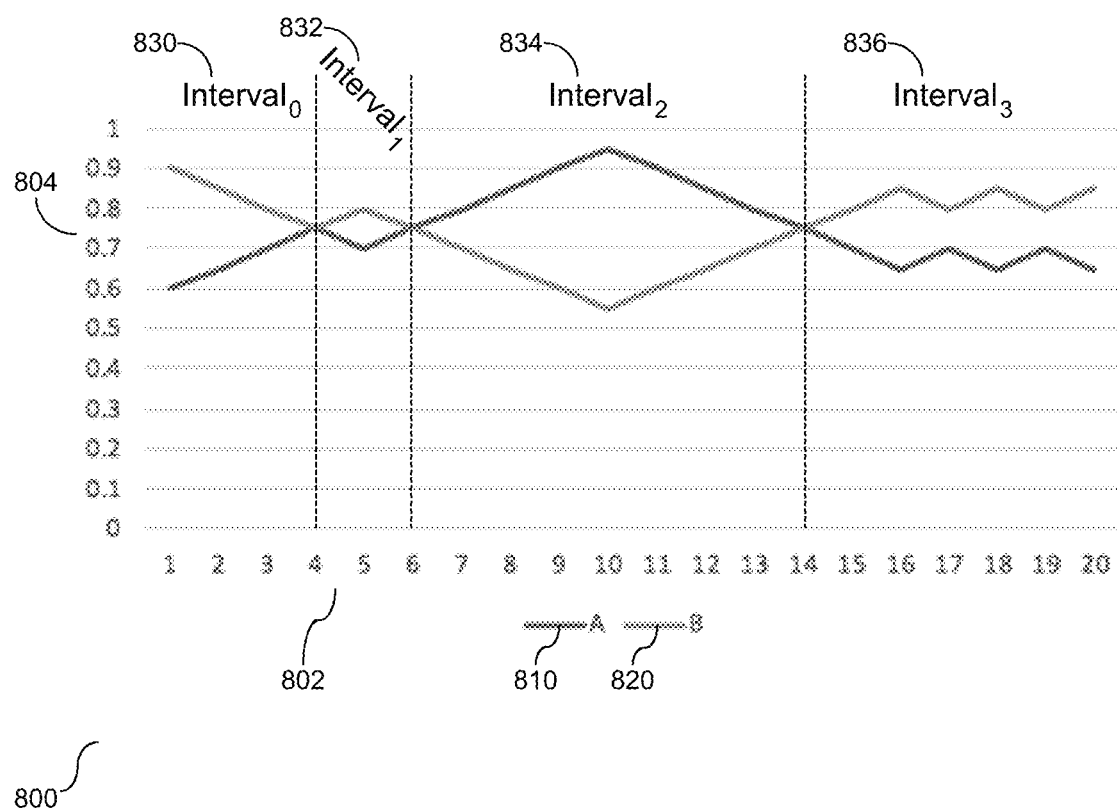
FIG. 8 depicts a graph illustrating the changes in weight score patterns.

Referring to FIG. 8, a graph (800) is provided to illustrate changes in weight score patterns. Similar to FIGS. 6 and 7, the horizontal axis represents units of time (802) and the vertical axis represents measurements of accuracy of the annotation metadata (804). Two functions are illustrated, including function$_A$ (810) corresponding to a first annotating entity, e.g. annotator$_A$, and function$_B$ (820) corresponding to a second annotating entity, e.g. annotator$_B$. Four apparent intervals are shown, and represented herein as interval$_0$ (830), interval$_1$ (832), interval$_2$ (834), and interval$_3$ (836). As shown, the work product of annotator$_A$ has greater accuracy than annotator$_B$ for the units of time measured in interval$_0$ (830), and interval$_2$ (834). The work product of annotator$_B$ has a greater accuracy than annotator$_A$ for the units of time measured in interval$_1$ (832) and interval$_3$ (836). The annotations generated by annotator$_A$ will be given a preference over the annotations generated by annotator$_B$ during the following intervals: interval$_0$ (832) and interval$_2$ (834) due to annotator$_A$ having a greater accuracy during this period. The preference will then dynamically change and the annotator generated by annotator$_B$ during interval$_1$ (832) and interval$_3$ (836) will then be preferred over the annotations created by annotator$_A$ during this period. Accordingly, the system dynamically changes the weight score assigned to an annotation responsive to the intervals and accuracy of annotators assessed across the corresponding intervals.

Deep learning is a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. Eventually, a result is delivered from the output layers. Deep learning complex neural networks are designed to emulate how the human brain works, so computers can be trained to support poorly defined abstractions and problems. Neural networks and deep learning are often used in image recognition, speech, and computer vision applications.

As shown and described in FIGS. 6-8, the weight scores of annotators can change overtime. Therefore, the metadata scores need to be adjusted dynamically to account for the changes in accuracy of the annotators. The data identified in FIG. 5 is used to create a neural model, also referred to herein as a machine learning model, or as input into an existing neural model. The running of a neural model is a sequence of layer-based computation, which identifies relationships between documents, grammatical elements, and corresponding annotations. The neural model is trained by extracting the identified metadata from the annotations attached to the grammatical elements from the documents, and inputting the extracted data and metadata into an existing or created model. The neural model identifies patterns associated with the input data on a plurality of dimensions. For example, the neural model may identify patterns based on the domain, time, annotating entity, etc., with the patterns expressly or inherently identifying accuracy.

Figure 9:
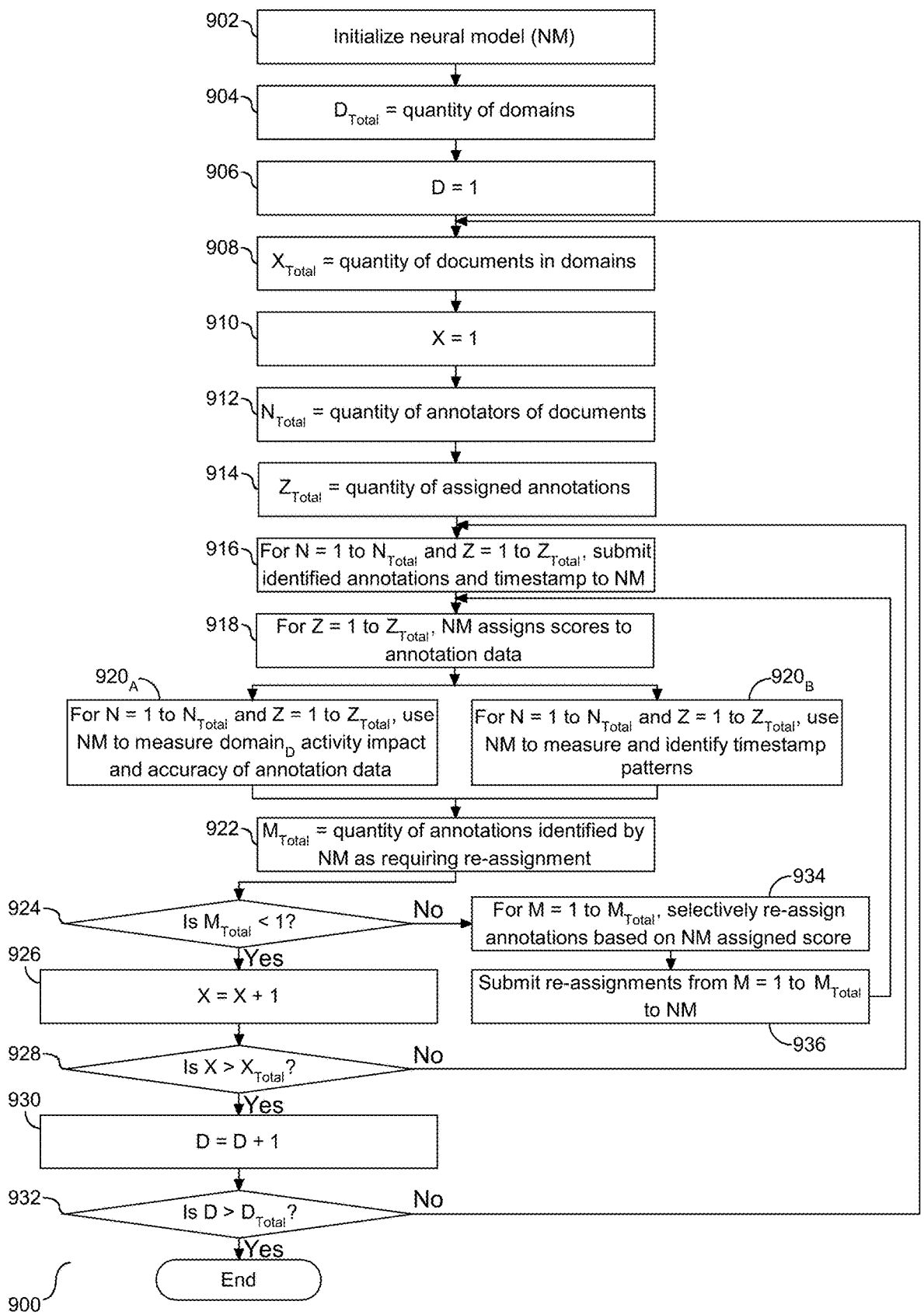
FIG. 9 depicts a flow chart illustrating a process for employing a neural model for evaluating annotations and selectively determining re-assignment.

Referring to FIG. 9, a flow chart (900) is provided to illustrate a process for employing a neural model for evaluating annotations and selectively determining re-assignment. A neural model is initialized (902). The variable D$_{Total}$ is assigned to represent the quantity of domains (904), and a corresponding domain counting variable, D, is initialized (906). The variable X$_{Total}$ is assigned to represent the quantity of documents in the domain (908). A corresponding document counting variable, X, is initialized (910). The variable N$_{Total}$ is assigned to represent the quantity of annotators of the subject documents (912) and the variable Z$_{Total}$ is assigned to represent the quantity of assigned annotations (914). For each of the annotated documents, the identified annotations and timestamps from each annotation for each annotating entity are submitted to the neural model (916). The neural model assesses the annotations and timestamps to determine patterns of the annotating entities. For each annotation, the neural model assigns or otherwise computes a score to the annotation data (918). In one embodiment the assigned score may be an assigned weight that is reflective of the accuracy of the annotation. Accordingly, the identified annotations and timestamps for each document in the domain are submitted to the neural model and a score is assigned by the neural model to the annotation.

Following step (918), the neural model measures domain$_D$ activity impact and the accuracy of the annotation data for each annotating entity and each annotation (920$_A$). Similarly, with respect to an associated timestamp(s), for each annotating entity and each annotation the timestamp is measured by the neural model to detect and identify the presence of any patterns associated with the annotating entities (920$_B$). The measurement steps (920$_A$) and (920$_B$) may be performed simultaneously or sequentially, in any order, or in near-parallel, to measure different aspects corresponding to the annotations. In one embodiment, the neural model may measure additional or alternative aspects directed at the annotations, and the measurements shown and described herein should not be considered limiting. Based on the measurements performed by the neural model in steps (920$_A$) and (920$_B$), the neural model identifies annotations that require re-assignment due to having a low accuracy score assigned to the annotation data. The variable M$_{Total}$ is assigned to represent the annotations identified by the neural model as requiring a re-assignment (922). Accordingly, the neural model measures characteristics associated with the annotations, shown herein as domain activity impact and timestamp(s), and identifies annotations requiring re-assignment based on the measurements.

Following step (922), it is determined if there are any annotations requiring re-assignment (924). A positive response to the determination at step (924) is followed by an increment of the domain counting variable, X, (926). It is then determined if the all of the documents in domain$_D$ have been assessed (928). If the response to step (928) is negative, then the process returns to step (916) to assess the next document$_X$ in domain$_D$. However, if the response to the determination at step (928) is positive, then the domain counting variable, D, is incremented (930), followed by determining if all of the domains have been assessed (932). If the response to step (932) is positive, the process ends as all of the documents and domains in the system have been assessed. If the response to step (932) is negative, then the process returns to step (908) to evaluate the next domain and the corresponding documents therein. Accordingly, all of the documents in each domain are submitted to the neural model to determine if there are any annotations present that require a re-assignment.

A negative response to the determination at step (924) is followed by selectively re-assigning the identified annotations (934) and submission of the re-assigned annotations to the neural model (936). The annotations effectively create ground truth data for the grammatical elements present and identified document. The process of assigning a score to the annotations is a characteristic of ground truth. By re-assignment annotations based on the corresponding score, the system and process effectively modify, and in one embodiment correct, any errors or conflicts associated with the ground truth data. In one embodiment, the assigned score is a weight score indicative of the accuracy of the annotation and the re-assignment is a ranking of the annotations based on the accuracy of the annotations. The re-assignments of each identified annotation are submitted to the neural model and the process returns to step (918). The submitted re-assigned annotations to the neural model serve as an update and add to the deep learning of the model. As the neural model continues to learn, the efficiency and accuracy of the model to identify annotations requiring re-assignment improves, thereby enhancing the accuracy of the ground truth data. Accordingly, the re-assigned annotations are submitted back into the neural model as an update to further train the neural model to identify annotations requiring re-assignment.

Figure 10:
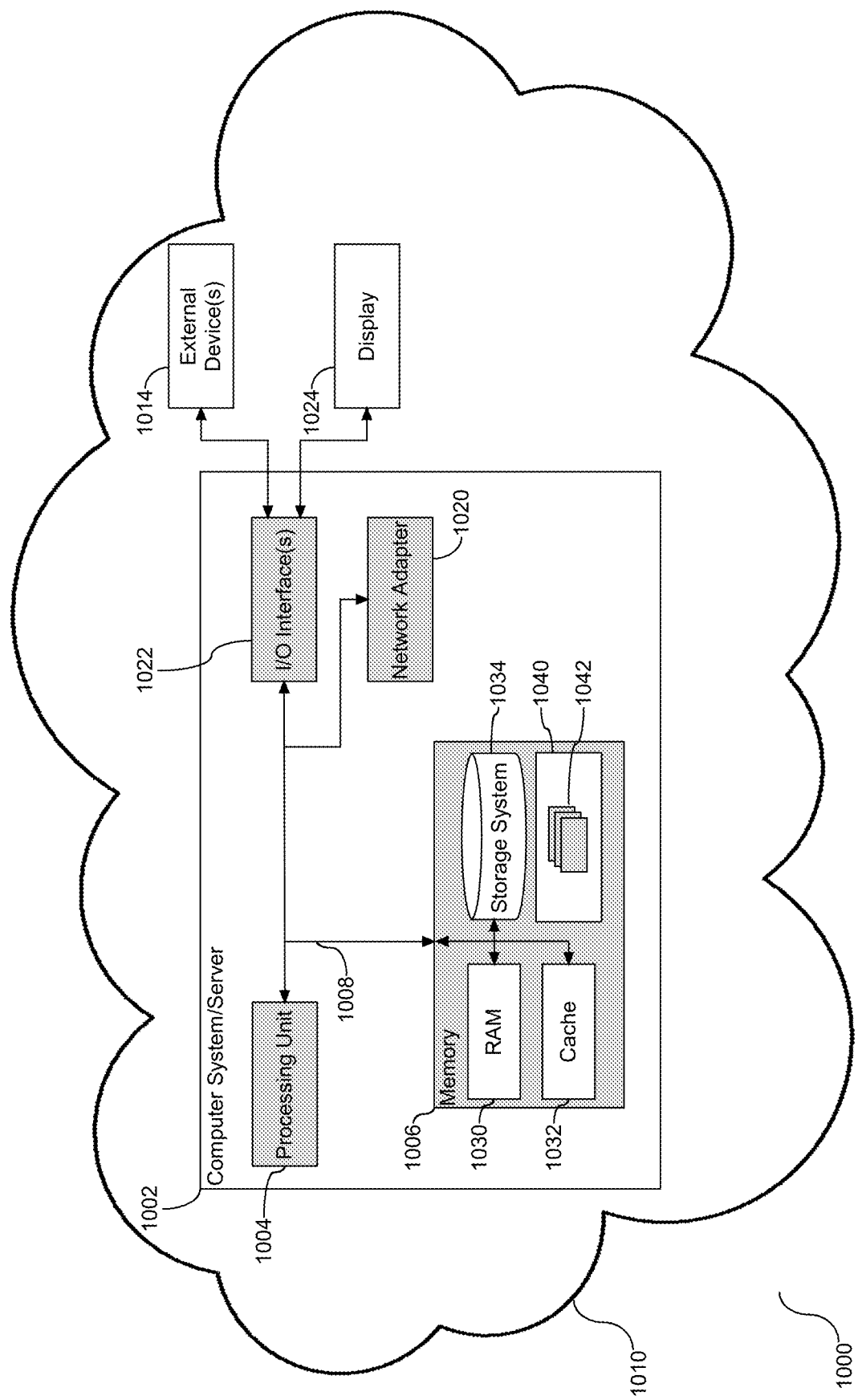
FIG. 10 depicts a block diagram illustrating an example of a computer system/server of a cloud based support system, to implement the system and processes described above with respect to FIGS. 1-9.

Embodiments shown and described herein may be in the form of a computer system for use with an intelligent computer platform for detecting the accuracy patterns of annotators and dynamically apply a weight score to construct ground truth data. Aspects of the tools (152)-(158) and their associated functionality may be embodied in a computer system/server in a single location, or in one embodiment, may be configured in a cloud based system sharing computing resources. With reference to FIG. 10, a block diagram (1000) is provided illustrating an example of a computer system/server (1002), hereinafter referred to as a host (1002) in a cloud computing environment (1010), to implement the system, tools, and processes described above with respect to FIGS. 1-9. Host (1002) is operational with numerous other general purpose or special purpose computing system environments or configurations. Examples of well-known computing systems, environments, and/or configurations that may be suitable for use with host (1002) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (1002) may be described in the general context of computer system-executable instructions, such as program modules, being executed by a computer system. Generally, program modules may include routines, programs, objects, components, logic, data structures, and so on that perform particular tasks or implement particular abstract data types. Host (1002) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, host (1002) is shown in the form of a general-purpose computing device. The components of host (1002) may include, but are not limited to, one or more processors or processing units (1004), e.g. hardware processors, a system memory (1006), and a bus (1008) that couples various system components including system memory (1006) to processor (1004). Bus (1008) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (1002) typically includes a variety of computer system readable media. Such media may be any available media that is accessible by host (1002) and it includes both volatile and non-volatile media, removable and non-removable media.

Memory (1006) can include computer system readable media in the form of volatile memory, such as random access memory (RAM) (1030) and/or cache memory (1032). By way of example only, storage system (1034) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1008) by one or more data media interfaces.

Program/utility (1040), having a set (at least one) of program modules (1042), may be stored in memory (1006) by way of example, and not limitation, as well as an operating system, one or more application programs, other program modules, and program data. Each of the operating systems, one or more application programs, other program modules, and program data or some combination thereof, may include an implementation of a networking environment. Program modules (1042) generally carry out the functions and/or methodologies of embodiments to detect the accuracy of annotation patterns and dynamically apply a weight score to construct ground truth data. For example, the set of program modules (1042) may include the tools (152)-(158) as described in FIG. 1.

Host (1002) may also communicate with one or more external devices (1014), such as a keyboard, a pointing device, etc.; a display (1024); one or more devices that enable a user to interact with host (1002); and/or any devices (e.g., network card, modem, etc.) that enable host (1002) to communicate with one or more other computing devices. Such communication can occur via Input/Output (I/O) interface(s) (1022). Still yet, host (1002) can communicate with one or more networks such as a local area network (LAN), a general wide area network (WAN), and/or a public network (e.g., the Internet) via network adapter (1020). As depicted, network adapter (1020) communicates with the other components of host (1002) via bus (1008). In one embodiment, a plurality of nodes of a distributed file system (not shown) is in communication with the host (1002) via the I/O interface (1022) or via the network adapter (1020). It should be understood that although not shown, other hardware and/or software components could be used in conjunction with host (1002). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (1006), including RAM (1030), cache (1032), and storage system (1034), such as a removable storage drive and a hard disk installed in a hard disk drive.

Computer programs (also called computer control logic) are stored in memory (1006). Computer programs may also be received via a communication interface, such as network adapter (1020). Such computer programs, when run, enable the computer system to perform the features of the present embodiments as discussed herein. In particular, the computer programs, when run, enable the processing unit (1004) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (1002) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 11:
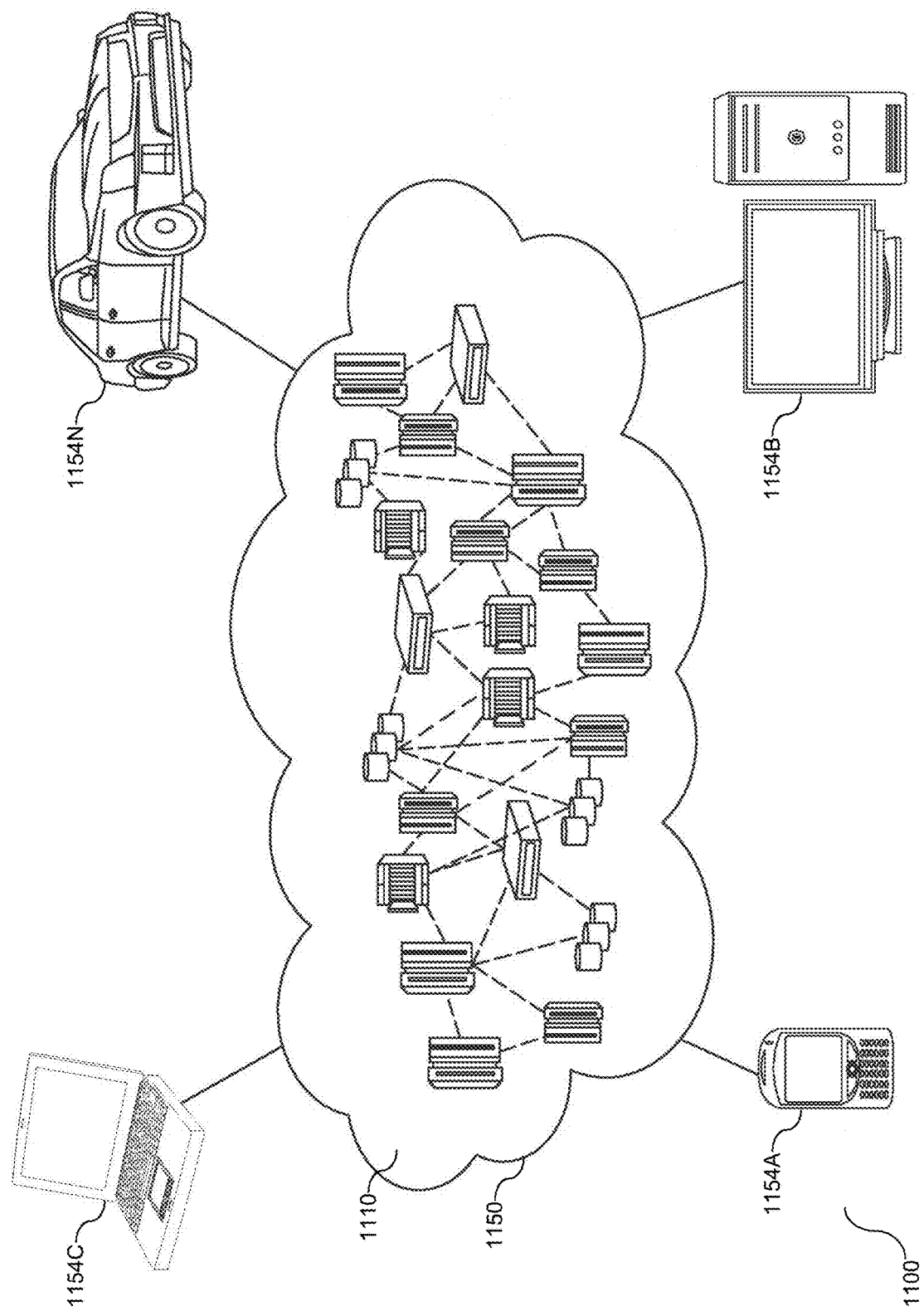
FIG. 11 depicts a block diagram illustrating a cloud computer environment.

Referring now to FIG. 11, an illustrative cloud computing network (1100). As shown, cloud computing network (1100) includes a cloud computing environment (1150) having one or more cloud computing nodes (1110) with which local computing devices used by cloud consumers may communicate. Examples of these local computing devices include, but are not limited to, personal digital assistant (PDA) or cellular telephone (1154A), desktop computer (1154B), laptop computer (1154C), and/or automobile computer system (1154N). Individual nodes within nodes (1110) may further communicate with one another. They may be grouped (not shown) physically or virtually, in one or more networks, such as Private, Community, Public, or Hybrid clouds as described hereinabove, or a combination thereof. This allows cloud computing environment (1200) to offer infrastructure, platforms and/or software as services for which a cloud consumer does not need to maintain resources on a local computing device. It is understood that the types of computing devices (1154A-N) shown in FIG. 11 are intended to be illustrative only and that the cloud computing environment (1150) can communicate with any type of computerized device over any type of network and/or network addressable connection (e.g., using a web browser).

Figure 12:
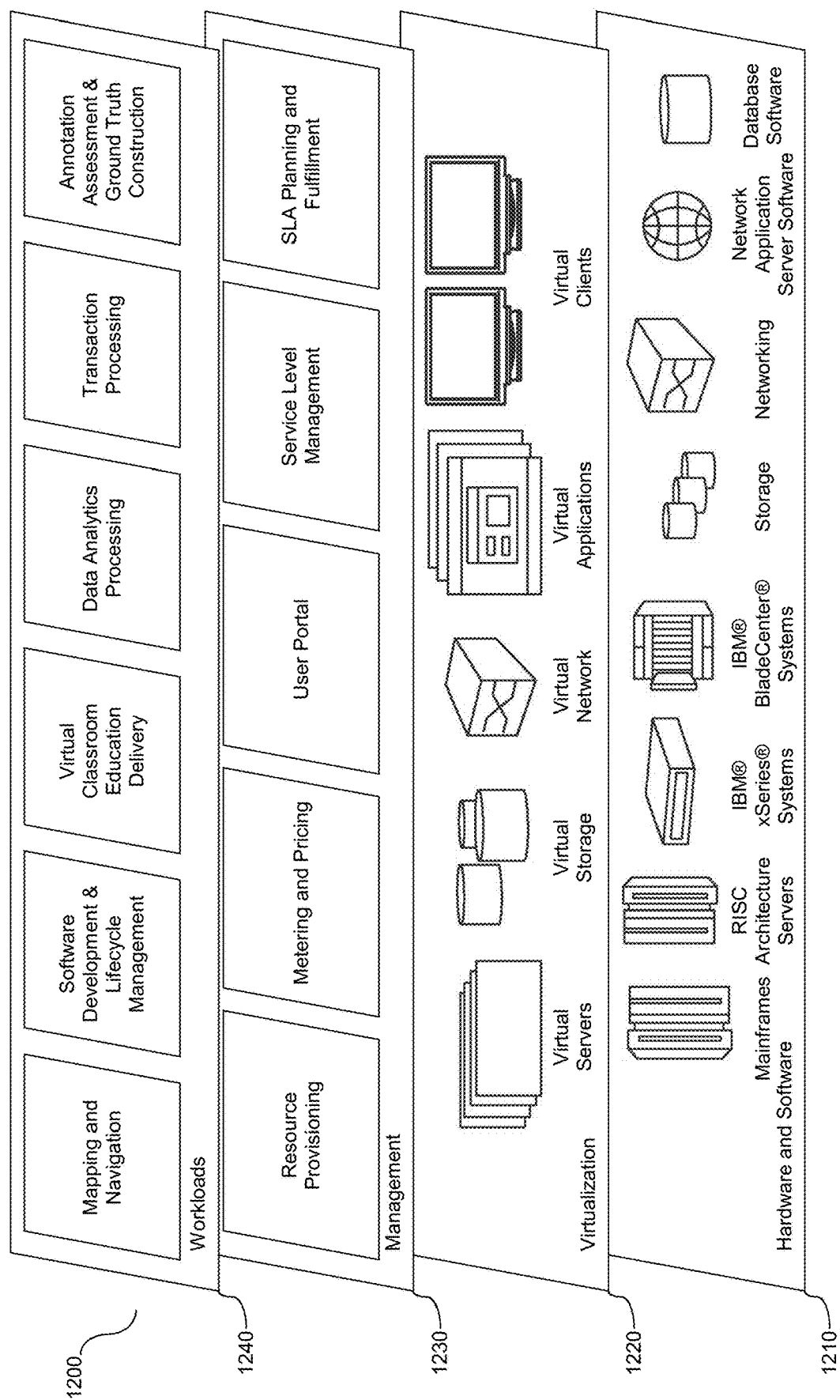
FIG. 12 depicts a block diagram illustrating a set of functional abstraction model layers provided by the cloud computing environment.

Referring now to FIG. 12, a set of functional abstraction layers (1200) provided by the cloud computing network of FIG. 11 is shown. It should be understood in advance that the components, layers, and functions shown in FIG. 12 are intended to be illustrative only, and the embodiments are not limited thereto. As depicted, the following layers and corresponding functions are provided: hardware and software layer (1210), virtualization layer (1220), management layer (1230), and workload layer (1240).

The hardware and software layer (1210) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1220) provides an abstraction layer from which the following examples of virtual entities may be provided: virtual servers; virtual storage; virtual networks, including virtual private networks; virtual applications and operating systems; and virtual clients.

In one example, management layer (1230) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1240) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and annotation assessment and ground truth construction.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, method, and/or a computer program product is operative to improve the functionality and operation of an artificial intelligence platform to resolve annotation assessment and ground truth construction.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
   a processing unit operatively coupled to memory; and
   an artificial intelligence (AI) platform in communication with the processing unit, the AI platform implementing at least one program module supporting construction of ground truth data, including to:
   identify an inter-annotation conflict between two or more annotations assigned to a grammatical element of a document, the two or more annotations having respective meta-data comprising an identifier of an annotating entity and a timestamp indicating a time of day at which the annotating entity assigned the annotation to the grammatical element;
   assess the two or more annotations for accuracy, including compare the accuracy of the two or more annotations based on the respective meta-data and dynamically score the respective meta-data of the two or more annotations responsive to the accuracy assessment, the score being indicative of an annotating ability of the annotating entity at the time of day indicated by the timestamp;

resolve the inter-annotation conflict, including select an annotation from the assessed two or more annotations based on the scores associated with the respective meta-data of the assessed two or more annotations;

selectively re-assign the selected annotation to the grammatical element responsive to resolving the inter-annotation conflict; and construct ground truth data including the grammatical element and the selected annotation.

2. The system of claim 1, wherein the selective annotation re-assignment comprises retaining the annotation assignment or releasing the annotation assignment.

3. The system of claim 1, wherein the accuracy annotation assessment further comprises the AI platform configured to detect one or more patterns corresponding to the accuracy of the annotation assignment by the annotating entity as a function of the time of day indicated by the timestamp.

4. The system of claim 3, wherein the AI platform is further configured to:
 subject the document to natural language processing (NLP);
 identify grammatical elements of the document subject to the NLP, wherein the domain is a classification characterization of subject matter of the document subject to the NLP;
 annotate the identified grammatical elements, including assign the annotations to the identified grammatical elements; and
 attach the domain to the annotation meta-data.

5. The computer system of claim 1, wherein the data element comprises the grammatical element of the document, the document having been subject to natural language processing.

6. A computer program product to construct ground truth data, the computer program product comprising:
 a computer readable storage medium having program code embodied therewith, the program code executable by a processor to:
  identify an inter-annotation conflict between two or more annotations assigned to a grammatical element of a document, the two or more annotations having respective meta-data comprising an identifier of an annotating entity and a timestamp indicating a time of day at which the annotating entity assigned the annotation to the grammatical element;
  assess the two or more annotations for accuracy, including compare the accuracy of the two or more annotations based on the respective meta-data and dynamically score the respective meta-data of the two or more annotations responsive to the accuracy assessment, the score being indicative of an annotating ability of the annotating entity at the time of day indicated by the timestamp;
  resolve the inter-annotation conflict, including select an annotation from the assessed two or more annotations based on the scores associated with the respective meta-data of the assessed two or more annotations;
  selectively re-assign the selected annotation to the grammatical element responsive to resolving the inter-annotation conflict; and
  construct ground truth data including the grammatical element and the selected annotation.

7. The computer program product of claim 6, wherein the selective annotation re-assignment comprises retaining the annotation assignment or releasing the annotation assignment.

8. The computer program product of claim 6, wherein the accuracy annotation assessment further comprises program code executable by the processor to detect one or more patterns corresponding to the accuracy of the annotation assignment by the annotating entity as a function of the time of day indicated by the timestamp.

9. The computer program product of claim 8, further comprising program code executable by the processor to:
 subject the document to natural language processing (NLP);
 identify the grammatical elements of the document subject to the NLP, wherein the domain is a classification characterization of subject matter of the document subject to the NLP;
 annotate the identified grammatical elements, including assign the annotations to the identified grammatical elements; and
 attach the domain to the annotation meta-data.

10. The computer program product of claim 6, wherein the data element comprises the grammatical element of the document, the document having been subject to natural language processing.

11. A method comprising:
 identifying an inter-annotation conflict between two or more annotations assigned to a grammatical element of a document, the two or more annotations having respective meta-data comprising an identifier of an annotating entity and a timestamp indicating a time of day at which the annotating entity assigned the annotation to the grammatical element;
 assessing the two or more annotations for accuracy, including comparing the accuracy of the two or more annotations based on the respective meta-data and dynamically scoring the meta-data of the two or more annotations, the score being indicative of an annotating ability of the annotating entity at the time of day indicated by the timestamp;
 resolving the inter-annotation conflict, including selecting an annotation from the assessed two or more annotations based on the scores associated with the respective meta-data of the assessed two or more annotations;
 selectively re-assigning the selected annotation to the grammatical element responsive to resolving the inter-annotation conflict; and
 constructing ground truth data including the grammatical element and the selected annotation.

12. The method of claim 11, wherein the selective annotation re-assignment comprises retaining the annotation assignment or releasing the annotation assignment.

13. The method of claim 11, wherein the accuracy annotation assessment further comprises detecting one or more patterns corresponding to the accuracy of the annotation assignment by the annotating entity as a function of the time of day indicated by the timestamp.

14. The method of claim 13, further comprising:
 subjecting the document to natural language processing (NLP);
 identifying the grammatical elements of the document subject to the NLP, wherein the domain is a classification characterization of subject matter of the document subject to the NLP; and
 annotating the identified grammatical elements, including assign the annotations to the identified grammatical elements, the annotating including attaching the domain to the annotation meta-data.

15. The method of claim 11, wherein the data element comprises the grammatical element of the document, the document having been subject to natural language processing.

\* \* \* \* \*